United States Patent
Tomikawa et al.

[11] 3,868,258
[45] Feb. 25, 1975

[54] FIREPROOFING COMPOSITION AND METHOD

[75] Inventors: Masami Tomikawa; Yutaka Mugino; Akiji Tsunoda; Hideo Ohkawa; Kazuhisa Kaneda, all of Chiba-ken, Japan

[73] Assignee: Idemitsu, Kosar Kabushiki-Kaisha (Idemitsu Kosan Co., Ltd.), Tokyo, Japan

[22] Filed: May 31, 1973

[21] Appl. No.: 365,480

[52] U.S. Cl. .............................. 106/15 FP, 106/74
[51] Int. Cl. ...................... C09d 1/02, C09d 5/18
[58] Field of Search ........................... 106/15 FP, 74

[56] References Cited
UNITED STATES PATENTS

| | | | |
|---|---|---|---|
| 3,333,973 | 8/1967 | Freiman | 106/74 X |
| 3,483,006 | 12/1969 | Vassilevsky et al. | 106/74 |
| 3,707,385 | 12/1972 | Kraemer et al. | 106/15 FP |

OTHER PUBLICATIONS

Lyons, "The Chemistry and Uses of Fire Retardants," 1970, pp. 248–9, (John Wiley & Sons, 1970) (tp265 L8 C3).
The Condensed Chemical Dictionary, 8 Ed., p. 160, (Van Nostrand Reinhold).

*Primary Examiner*—Allan Lieberman
*Assistant Examiner*—T. DeBenedictis, Sr.
*Attorney, Agent, or Firm*—William J. Daniel

[57] ABSTRACT

A fireproofing composition comprising a mixture of water glass and calcium sulfite, and optionally a small quantity of a non-ionic surface active agent can be coated on the surface of a combustible body and hardened, forming an incombustible protective film thereon.

7 Claims, No Drawings

“FIREPROOFING COMPOSITION AND METHOD

BACKGROUND OF THE INVENTION

This invention relates to compositions capable of self-hardening to form an incombustible body. In one embodiment, the invention relates to a fireproofing composition for forming incombustible coating films and comprised of water glass, calcium sulfite and, optionally, a small quantity of a non-ionic surface active agent.

Incombustible materials heretofore used widely include cement and gypsum. These materials exhibit hydration and their paste with water undergoes gelation (coagulation) and hardening to form a hard incombustible product when allowed to stand.

However, while hardened cement products have sufficient compressive strength, they are inferior in bending strength and tensile strength, thus raising difficulties for use in the form of thin plates. Further, their rough surface and aesthetically unappealing color make them poorly suitable for utilization as indoor decorative materials. Furthermore, hardening of a paste of cement and water requires a long time with corresponding processing disadvantages. Hardened gypsum products, on the other hand, have comparatively smooth surfaces and are extensively utilized as indoor decorative materials. However, they are not desirable for use as building materials because of their poor mechanical strength.

In addition to cement and gypsum, synthetic resins are used for molded products in various fields. As they are combustible, however, they are prone when used as wall materials and furniture materials to catch fire accidentally or suffer considerable damage in case of fire.

It is well known in the art to incorporate antimony compounds, halogen compounds or phosphorus compounds into combustible resins to render them incombustible. However, any of the incorporated compounds contain at least one poisonous element. If the resultant incombustible resins are involved in a fire, they will produce a great quantity of poisonous gas due to the combustion or thermal decomposition of the incorporated compound.

Japanese Patent Publication No. 13,874/1972 discloses a method of treating polystyrene foam or the like foamed bodies to render them incombustible by coating their surface with a liquid prepared by mixing water glass, a small quantity of slaked lime and an adequate quantity of water and placing the coated articles in a furnace kept at a temperature of 30°–60°C and filled with $CO_2$ gas until the coating hardens into an incombustible film on the foamed product. However, due to the requirement of thermal treatment in a furnace filled with $CO_2$ gas, this method is low in efficiency of operation and is not applicable to materials in already constructed buildings. Therefore, this method is industrially not advantageous.

BRIEF SUMMARY OF THE INVENTION

Accordingly, it is an object of this invention to provide a fireproofing composition capable of undergoing self-hardening to give a product having a smooth and aesthetically attractive surface and excellent mechanical strength.

It is another object of this invention to provide a fireproofing composition capable of forming an incombustible protective film when coated on the surface of a combustible body and hardened.

It is a further object of this invention to provide a method of rendering a combustible body incombustible by coating the surface thereof with the aforementioned fireproofing composition.

The above and other objects, features and advantages of the invention will appear more fully from the following description.

DETAILED DESCRIPTION OF THE INVENTION

The composition according to the invention contains water glass and calcium sulfite as essential components. When intended for use in making molded articles, the composition should desirably contain the water glass and calcium sulfite in a ratio within a range from 1:1 to 7:3. If the quantity of calcium sulfite is less than this range, the gelation time will be greatly extended with a concomitant lowering in operation efficiency. On the other hand, if the quantity of calcium sulfite is excessively large, it will not mix well with water glass and a high quality composition will not be produced.

According to this invention, it is necessary to select calcium sulfite as the component to be added to water glass. If it is replaced with calcium carbonate or calcium sulfate, the intended object cannot be achieved. In the case of adding calcium sulfate to water glass, for example, both will quickly react with each other to produce a precipitate, thus making uniform kneading impossible. In the case of adding calcium carbonate to water glass, the gelation time of the resultant composition will become extremely long, so that the use of a gelling agent such as sodium fluorosilicate would be needed. In contrast, the calcium sulfite employed in this invention has excellent compatibility with water glass and imparts to the resultant composition a gelling property advantageous in the processing of the composition.

The composition of the invention when intended for making molded articles may readily be prepared by adding a given amount of calcium sulfite to commercially available water glass (a water solution of sodium silicate) and kneading the mixture.

This composition can be used as a refractory material, heat insulation material or construction material by forming it into a suitable shape and hardening. Also, it may be used for boards requiring an aesthetic appearance, statues and manekins.

When the composition of this invention is used for forming an incombustible protective film, it is advantageous to limit the quantity of calcium sulfite to at most 30% by weight of the total weight of the resultant composition.

Various materials may be used as the surface active agent to be added as an auxiliary component to the water glass. However, since water glass is alkaline, it is preferable to use alkali-resisting surface active agents, which include non-ionic surface active agents such as polyoxyethylene alkyl esters, polyoxyethylene phenol ethers and sorbitan fatty acid esters. These surface active agents serve to facilitate the formation of a uniform film in the case of applying the coating according to this invention onto the surface of a hydrophobic resin. The surface active agent may be incorporated in a very small quantity, usually of the order of about 0.1 percent by weight of the composition.

The composition of this invention may be cast into moldings of rod-like form, plate-like form and various other forms. In this case, pearlite, Shirasu balloon, asbestos, glass fiber, metal fiber, etc., may be added for the purpose of reducing the weight of the product and reinforcing it. The quantity of such additives is appropriately determined according to the desired mechanical properties of the final product with the proviso that the miscibility of the essential components should not be impared.

The composition of this invention can also be applied onto the surface of various combustible articles to render them incombustible. For example, by applying the composition of this invention onto the surface of a foamed or non-foamed body of a combustible thermoplastic resin, such as polyethylene, polypropylene and polystyrene by the usual coating methods including, for example, brushing, immersion and spraying, and then leaving the body at room temperature, a hard incombustible film composed of a reaction product of water glass and calcium sulfite is formed on the surface. In this case, a coating quantity of about 0.012 g/cm$^2$ is usually sufficient. The hardened film thus formed is not only incombustible but also has excellent chemical and mechanical properties. More precisely, the film has excellent water-proofness, chemical resistance and heat insulation as well as good tensile strength, bending strength and compressive strength. Moreover, this film is so smooth and transparent that the aesthetic appearance of the resin base is not impaired. Further, the composition is free of any poisonous element and will never generate any poisonous gas when involved in a fire.

This invention will be illustrated in more detail by way of the following examples.

EXAMPLE 1

A given amount of calcium sulfite is added to commercially available water glass of various types (manufactured by Nippon Kagaku Kogyo K.K.) and the mixture was kneaded. The resultant paste was cast into a plate-like article, which was then allowed to stand at room temperature to cause gelation and hardening.

Table 1 lists the time required until each paste is gelled after the molding and the hardness of each final hardened product. For the purpose of comparison, examples wherein other inorganic compounds were added to water glass are also listed in Table 1.

Table 2 shows the physical properties of hardened products obtained from the compositions of this invention in comparison with Table 1

| Test No. | Composition | | | | Gelation Time (Min) | Hardness (Shore)[2] |
|---|---|---|---|---|---|---|
| | Water Glass | | Additive | | | |
| | Type | Amt. pts/wt | Kind | Amt. pts/wt | | |
| 1[1] | JIS No. 3 | 90 | Calcium Sulfite | 10 | >24 hrs. | — |
| 2 | do. | 70 | do. | 30 | 40 | 70 |
| 3 | do. | 60 | do. | 40 | 10 | 52 |
| 4 | do. | 50 | do. | 50 | 8 | 42 |
| 5[1] | do. | 30 | do. | 70 | Inc. Mix[3] | |
| 6 | JIS No. 2 | 50 | do. | 50 | 10 | 43 |
| 7 | JIS No. 1 | 50 | do. | 550 | 8 | 40 |
| 8[1] | JIS No. 3 | 50 | Calcium Sulfate | 50 | Inc. Mix | |
| 9[1] | do. | 50 | Calcium Hydroxide | 50 | Inc. Mix | |
| 10[1] | do. | 50 | Calcium Carbonate | 50 | >24 hrs. | |
| 11[1] | do. | 50 | Zinc Oxide | 50 | >24 hrs. | |

[1] Comparative example.
[2] Sample of hardened product tested according to JIS B-7727.
[3] Mixing too incomplete to test.

Table 2

| Molding Material | Gelation Time | Properties of Hardened Product | | | | |
|---|---|---|---|---|---|---|
| | | Spec. Gray. | Compr. Str. (kg/cm$^2$)[4] | Bend. Str. (kg/cm$^2$)[5] | Color | Shore Hard. |
| Comp. of Inven. (70/30)[1] | 40 Min. | 1.18 | 165 | 70 | White | 70 |
| Ditto (60/30)[1] | 10 Min. | 1.84 | 180 | 85 | White | 52 |
| Ditto (50/50) | 8 Min. | 1.87 | 200 | 100 | White | 42 |
| Cement[2] | 6 Hrs. | 3.15 | 350 | 40 | Grey | 19 |
| Gypsum[3] | 5 Hrs. | 2.30 | 65 | 20 | White | 15 |

[1] Weight ratio of No. 3 water glass to calcium sulfite.
[2] Composed of 21.4% SiO$_2$, 64.5% CaO, 5.4% Al$_2$O$_3$, and the balance being Fe$_2$O$_3$ and MgO.
[3] Baked gypsum.
[4] Tested according to JIS A-1108.
[5] Tested according to JIS A-1106.

the physical properties of hardened products from cement and gypsum alone.

From the results of experiments shown in Tables 1 and 2, it will be seen that the composition according to the invention has excellent properties as an inorganic molding material.

EXAMPLE 2

A given amount of calcium sulfite was added to water glass (JIS No. 3, an aqueous solution of sodium silicate), and to the resultant mixture was added a given amount of "Emasol 110" (sorbitan monolaurate series manufactured by Kao Atras K.K.) as the surface active agent to obtain an incombustible composition.

The composition thus obtained was coated over the entire surface of each of a sheet-like polyethylene foamed body (density: 0.04 g/cc, sample A), a polyethylene body (density: 0.923 g/cc, sample B) and a foamed body composed of 40 parts by weight of polyethylene and 60 parts by weight of calcium sulfite (density: 0.2, sample C) by a brush coating method, and then left at room temperature for 30 minutes.

A combustion test was then made on the individual samples thus prepared according to ASTM D-2867 (1970) for obtaining an oxygen index giving an evaluation of their incombustibility. The results are shown in Table 3.

Samples having an oxygen index above 27.0 to 28.0 exhibit self-extinguishing property (see SPE Journal, February, 1971, Vol. 27, page 23).

Table 3

| Composition of Coating wt/% | | | Oxygen Index From Combustion Test | | | |
|---|---|---|---|---|---|---|
| Water Glass | $SO_3$ | "Emasol" | | Samp A | Samp B | Samp C |
| 96.9 | 3.0 | 0.1 | Not Treated | 17.5 | 19.0 | 21.0 |
|  |  |  | Treated | 40.0 | 52.0 | 45.0 |
| 70.0 | 29.9 | 0.1 | Not Treated | 17.5 | 19.0 | 21.0 |
|  |  |  | Treated | 37.5 | 50.0 | 41.0 |

It will be understood from the results shown in Table 3 that while all the non-treated samples show no self-extinguishing property, all the samples treated with the treating agent of this invention show a high oxygen index and a self-extinguishing property.

What is claimed is:

1. A fireproof composition comprising the hardened reaction product of a homogeneous mixture consisting essentially of calcium sulfite and water glass.

2. A composition according to claim 1 for making molded articles wherein the ratio of water glass to calcium sulfite is 1:1 to 7:3.

3. A composition according to claim 1 for forming an incombustible protective film which comprises in addition to said mixture of water glass and calcium sulfite, a small quantity of a non-ionic surface active agent.

4. A composition according to claim 3 wherein the content of calcium sulfite is about 10–30% by weight of the total weight of the composition.

5. A method of making an incombustible article which comprises forming at least the exposed surfaces of said article from a hardened reaction product of a homogeneous mixture consisting essentially of calcium sulfite and water glass.

6. The method of claim 5 wherein said article is normally combustible and the surface thereof is coated with said mixture containing about 10–30% by weight of said calcium sulfite.

7. The method of claim 6 wherein said article has a hydrophobic surface and a minor amount of a compatible surface active agent is added to said mixture.

* * * * *

UNITED STATES PATENT OFFICE
CERTIFICATE OF CORRECTION

PATENT NO. : 3,868,258
DATED : February 25, 1975
INVENTOR(S) : Masami Tomikawa; Yutaka Mugino; Akiji Tsunoda; Hideo Ohkawa; Kazuhisa Kaneda It is certified that error appears in the above—identified patent and that said Letters Patent are hereby corrected as shown below:

Insert on the title page, after item [21] the following:

-- [30]     Foreign Application Priority Data

June 1, 1972    Japan....................53810/Sho. 47
    June 13, 1972    Japan....................58244/Sho. 47

Signed and sealed this 20th day of May 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

PATENT NO. : 3,868,258
DATED : February 25, 1975
INVENTOR(S) : Tomikawa et al

It is certified that error appears in the above-identified patent and that said Letters Patent are hereby corrected as shown below:

In item [73], please delete in line 1, "idemitsu, Kosar"

and insert therefor --Idemitsu Kosan--

Signed and Sealed this nineteenth Day of August 1975

[SEAL]

Attest:

RUTH C. MASON
Attesting Officer

C. MARSHALL DANN
Commissioner of Patents and Trademarks